United States Patent
Quinn

(10) Patent No.: US 7,888,931 B2
(45) Date of Patent: Feb. 15, 2011

(54) MAGNETIC WINDING AND METHOD OF MAKING SAME

(75) Inventor: Victor W. Quinn, Rush, NY (US)

(73) Assignee: RAF Tabtronics, LLC, Piffard, NY (US)

( * ) Notice: Subject to any disclaimer, the term of this patent is extended or adjusted under 35 U.S.C. 154(b) by 183 days.

(21) Appl. No.: 12/366,164

(22) Filed: Feb. 5, 2009

(65) Prior Publication Data

US 2009/0138221 A1    May 28, 2009

Related U.S. Application Data

(62) Division of application No. 10/988,240, filed on Nov. 12, 2004, now Pat. No. 7,506,280.

(51) Int. Cl.
*G01N 27/72* (2006.01)
*G01B 1/00* (2006.01)

(52) U.S. Cl. .................. 324/228; 702/155; 324/229

(58) Field of Classification Search .............. 708/800, 708/801, 845; 336/200, 223, 232; 324/200, 324/228, 229; 702/155, 170
See application file for complete search history.

(56) References Cited

U.S. PATENT DOCUMENTS

| | | | |
|---|---|---|---|
| 3,898,436 A | 8/1975 | Pottebaum et al. |
| 3,985,310 A | 10/1976 | Kent et al. |
| 4,052,599 A | 10/1977 | Whiteley et al. |
| 4,926,123 A | 5/1990 | Redlich |
| 5,612,906 A | 3/1997 | Gotz |
| 5,749,985 A | 5/1998 | Sparks et al. |
| 5,942,830 A | 8/1999 | Hill |
| 6,252,486 B1 | 6/2001 | Wolf |
| 6,281,614 B1 | 8/2001 | Hill |
| 6,363,297 B1 | 3/2002 | Wienholt et al. |
| 6,434,724 B1 | 8/2002 | Chang et al. |
| 6,455,971 B1 | 9/2002 | Palma, Sr. et al. |
| 6,507,938 B1 | 1/2003 | Roy-Neogi et al. |
| 6,536,701 B2 | 3/2003 | Fulton et al. |
| 6,536,704 B1 | 3/2003 | Rautakorpi et al. |
| 6,617,665 B2 | 9/2003 | Farcy et al. |
| 6,628,531 B2 | 9/2003 | Dadafshar |
| 6,650,217 B1 | 11/2003 | Wolf et al. |

(Continued)

OTHER PUBLICATIONS

ISA/US, International Search Report for PCT/US05/41115, Jun. 13, 2008.

(Continued)

*Primary Examiner*—Anh T Mai
(74) *Attorney, Agent, or Firm*—Phillips Lytle LLP

(57) ABSTRACT

The present invention provides an improved magnetic winding and method of calculating desired winding parameters (winding layer thickness, number of winding layers and number of turns per winding layer) for a winding in a magnetic component. The invention may be applied to general boundary conditions in a magnetic winding or component and considers relative phase displacement for sinusoidal and nonsinusoidal winding currents. Ratios of magnetic surface field intensities at corresponding inner and outer boundaries of one or more winding layer(s) are calculated, and considered with relative phase displacement to select magnetic winding configurations having desired or optimal power dissipation. In certain aspects, a normalized loss function $f(H,R,B,\Phi)$ is utilized to determine a preferred construction among a plurality of iteratively generated selections.

116 Claims, 4 Drawing Sheets

$$\vec{H}_n = H_n \cos(\omega t + \varphi_n)$$

10 →

$$\vec{H}_{n-1} = H_{n-1} \cos(\omega t + \varphi_{n-1})$$

U.S. PATENT DOCUMENTS

| | | | |
|---|---|---|---|
| 6,661,326 | B2 | 12/2003 | Yeh et al. |
| 6,752,347 | B2 | 6/2004 | Lannes et al. |
| 6,758,430 | B1 | 7/2004 | Palma, Sr. et al. |
| 6,791,224 | B1 | 9/2004 | Ozawa et al. |
| 7,029,941 | B2 * | 4/2006 | Min et al. ............... 438/48 |
| 7,089,130 | B2 * | 8/2006 | Yamagajo et al. ........ 702/65 |
| 7,239,977 | B2 | 7/2007 | Fantana et al. |
| 7,613,578 | B2 * | 11/2009 | Hagmann ............... 702/64 |
| 7,652,485 | B2 * | 1/2010 | Kazama ............... 324/632 |
| 2004/0204775 | A1 | 10/2004 | Keyes et al. |
| 2009/0006011 | A1 * | 1/2009 | Kazawa et al. ........... 702/57 |

OTHER PUBLICATIONS

ISA/US, Written Opinion of the International Searching Authority for PCT/US05/41115, Jun. 13, 2008.

ISA/US, Notification of Transmittal of the International Search Report and the Written Opinion of the International Searching Authority, or the Declaration for PCT/US05/41115, Jun. 13, 2008.

Ray Ridley, Proximity Loss in Magnetic Windings, Switching Power Magazine, 2003, pp. 8-10, 12-16, 18 (all pages), vol. 4, Issue 4, US.

Majid Dadafshar, Planar Transformer Designs Improve Power Supply Efficiency, May 2004, pp. 1-9 (all pages), Pulse Engineering, US.

V.W. Quinn, Calculation and Measurement of Power Dissipation and Energy Storage in a High Frequency Planar Transformer, 1994, IEEE APEC, pp. 308-317 (all pages), US.

P.L. Dowell, Effects of Eddy Currents in Transformer Windings, Proceedings of the Institution of Electrical Engineers, Aug. 1966, pp. 1387-1394, vol. 113, Issue 8, published in U.S.

M.P. Perry, Multiple Layer Series Connected Winding Design for Minimal Losses, IEEE Transactions on Power Apparatus and Systems, Jan./Feb. 1979, pp. 116-123, vol. PAS-98, No. 1, published in U.S.

International Bureau of WIPO, Notification Concerning Transmittal of International Preliminary Report on Patentability (Chapter I of the Patent Cooperation Treaty) for PCT/US05/41115, Mar. 5, 2009.

International Bureau of WIPO, International Preliminary Report on Patentability (Chapter I of the Patent Cooperation Treaty) for PCT/US05/41115, Feb. 24, 2009.

* cited by examiner $\vec{H}_n = H_n \cos(\omega t + \varphi_n)$ $\vec{H}_{n-1} = H_{n-1} \cos(\omega t + \varphi_{n-1})$

Fig. 2

$$f(H_{n-1}, R_n, B_n, \Phi_n) = \frac{H_{n-1}^2 * \left[ (e^{B_n} - e^{-B_n})[(R_n^2 + 1)(e^{B_n} + e^{-B_n}) - 4R_n \cos B_n \cos \Phi_n] + 2(R_n^2 + 1)\sin(2B_n) - 4R_n(e^{B_n} + e^{-B_n})\sin(B_n)\cos \Phi_n \right]}{2\delta[e^{2B_n} + e^{-2B_n} - 2\cos(2B_n)]}$$

where: $R_n = H_n/H_{n-1}$ and $\Phi_n = \varphi_n - \varphi_{n-1}$

Fig. 3

|                              | Winding 1 | Winding 2 | Winding 3 |
|------------------------------|-----------|-----------|-----------|
| Winding Length (Meters)      | 0.1       | 0.1       | 0.10      |
| Current Magnitude (Amperes)  | 1         | 1         | 1.88      |
| Current Phase (Radians)      | -1.3      | 0.5       | 2.23      |

*Before Improvement*

| B (ratio) | Layer Number | Turns / Layer |  |  | H_below |  | H_above |  | Boundary Conditions |  | H_0 |  |
|---|---|---|---|---|---|---|---|---|---|---|---|---|
|  |  | Winding 1 | Winding 2 | Winding 3 | Mag (AT/M) | Phase (Rad) | Mag (AT/M) | Phase (Rad) | R (ratio) | Phase Shift (Rad) | Mag (AT/M) | Normalized Dissipation |
| 2 | 6 | 6 |  |  | 61.26 | -0.54 | 60.00 | -1.57 | 0.98 | -1.04 | 61.26 | 5.2% |
| 2 | 5 |  | 6 |  | 105.39 | -0.02 | 61.26 | -0.54 | 0.58 | -0.51 | 105.39 | 10.1% |
| 2 | 4 |  |  | 6 | 94.00 | 1.17 | 105.39 | -0.02 | 1.12 | -1.19 | 94.00 | 14.4% |
| 2 | 3 |  |  | 6 | 178.54 | 1.75 | 94.00 | 1.17 | 0.53 | -0.58 | 178.54 | 27.9% |
| 2 | 2 | 6 |  |  | 118.91 | 1.71 | 178.54 | 1.75 | 1.50 | 0.05 | 118.91 | 30.4% |
| 2 | 1 | 6 |  |  | 60.00 | 1.57 | 118.91 | 1.71 | 1.98 | 0.14 | 60.00 | 12.0% |
| Totals |  | 12 | 12 | 12 |  |  |  |  |  |  |  | 100.0% |

*After Improvement*

| B (ratio) | Layer Number | Turns / Layer |  |  | H_below |  | H_above |  | Boundary Conditions |  | H_0 |  |
|---|---|---|---|---|---|---|---|---|---|---|---|---|
|  |  | Winding 1 | Winding 2 | Winding 3 | Mag (AT/M) | Phase (Rad) | Mag (AT/M) | Phase (Rad) | R (ratio) | Phase Shift (Rad) | Mag (AT/M) | Normalized Dissipation |
| 1.10 | 6 | 6 |  |  | 61.26 | -0.54 | 60.00 | -1.57 | 0.98 | -1.04 | 61.26 | 3.6% |
| 0.87 | 5 |  | 6 |  | 105.39 | -0.02 | 61.26 | -0.54 | 0.58 | -0.51 | 105.39 | 4.5% |
| 1.22 | 4 |  |  | 6 | 94.00 | 1.17 | 105.39 | -0.02 | 1.12 | -1.19 | 94.00 | 11.5% |
| 0.94 | 3 |  |  | 6 | 178.54 | 1.75 | 94.00 | 1.17 | 0.53 | -0.58 | 178.54 | 14.6% |
| 0.64 | 2 | 6 |  |  | 118.91 | 1.71 | 178.54 | 1.75 | 1.50 | 0.05 | 118.91 | 6.1% |
| 0.83 | 1 | 6 |  |  | 60.00 | 1.57 | 118.91 | 1.71 | 1.98 | 0.14 | 60.00 | 4.7% |
| Totals |  | 12 | 12 | 12 |  |  |  |  |  |  |  | 83.3% |

Fig. 4

|  | Winding 1 | Winding 2 |
|---|---|---|
| Winding Length (Meters) | 0.1 | 0.1 |
| Current Magnitude (Amperes) | 1 | 1.41 |
| Current Phase (Radians) | 0 | 2.36 |

*Before Improvement*

| | | | $H_{below}$ | | $H_{above}$ | | Boundary Conditions | | $H_0$ | Normalized |
|---|---|---|---|---|---|---|---|---|---|---|
| B (ratio) | Layer Number | Turns / Layer | Mag (AT/M) | Phase (Rad) | Mag (AT/M) | Phase (Rad) | R (ratio) | Phase Shift (Rad) | Mag (AT/M) | Dissipation |
| 1.57 | 2 | 10 | 111.80 | -0.46 | 50.00 | 4.71 | 0.45 | 5.18 | 111.80 | 42.7% |
| 1.57 | 1 |  | 50.00 | 1.57 | 111.80 | -0.46 | 2.24 | -2.03 | 50.00 | 57.3% |
| Totals | | 12 | | | | | | | | 100.0% |

*After Improvement*

| | | | $H_{below}$ | | $H_{above}$ | | Boundary Conditions | | $H_0$ | Normalized |
|---|---|---|---|---|---|---|---|---|---|---|
| B (ratio) | Layer Number | Turns / Layer | Mag (AT/M) | Phase (Rad) | Mag (AT/M) | Phase (Rad) | R (ratio) | Phase Shift (Rad) | Mag (AT/M) | Dissipation |
| 1.57 | 3 | 10 | 111.80 | -0.46 | 50.00 | 4.71 | 0.45 | 5.18 | 111.80 | 42.7% |
| 0.68 | 2 | 3 | 72.80 | -0.28 | 111.80 | -0.46 | 1.54 | -0.19 | 72.80 | 12.8% |
| 3.14 | 1 | 7 | 50.00 | 1.57 | 72.80 | -0.28 | 1.46 | -1.85 | 50.00 | 27.8% |
| Totals | | 12 | | | | | | | | 45.0% |

Fig. 5

MAGNETIC WINDING AND METHOD OF MAKING SAME

CROSS-REFERENCE TO RELATED APPLICATIONS

The present application is a divisional of co-pending U.S. patent application Ser. No. 10/988,240, filed Nov. 12, 2004, which is herein incorporated by reference.

TECHNICAL FIELD

The present invention relates generally to magnetic components and, more specifically, to an improved method of calculating or selecting desired magnetic winding parameters including winding layer thickness, number of winding layers and number of turns per winding layer, and an improved wound magnetic component such as a coil, inductor, transformer or motor having reduced power dissipation.

BACKGROUND OF THE INVENTION

Magnetic and inductive components and devices such as coils, inductors, transformers, motors and others (referred to herein as magnetic components) include a winding of one or more of a variety of conductors. Such magnetic components utilize a variety of conductor types including round, square, or rectangular wire; thin conductor strips or foil; multiple wires twisted together or wound in parallel; various Litz or woven magnet wire braids (to increase uniformity of current sharing between elementary conductors); and various combinations of such conductor types.

Conventional solenoidal magnetic components comprise winding layers which form cylinders around a core. In contrast, planar magnetic components utilize conductors and combinations of conductors in an annular configuration. Round, square or rectangular wire, for example, may be wound in annular configurations. In addition, thin conductor strips or foil may be implemented in annular configurations using printed circuit boards, flex circuits, or discrete conductors fabricated from sheet stock, for example, and in other configurations known to those skilled in the art. In comparison to solenoidal magnetic components, the thickness of winding layers and the number of turns per layer in planar magnetic components, such as those on printed circuit boards, may be varied easily and inexpensively.

FIG. 1 illustrates a cross-section of a winding region or portion in a typical magnetic component having n layers. In FIG. 1, the winding length of each layer is designated l. The thickness of each winding layer is designated $T_1$ through $T_n$, and each layer has $N_i$ turns, designated $N_1$ through $N_n$. The magnetic surface field intensities at the inner and outer boundaries of the ith winding layer are designated as $H_{i-1}$ and $H_i$ respectively. The current in the ith winding is designated $I_i$ and points out of the plane of the paper. When the winding length l is much greater than the winding layer thickness, the magnetic field distribution is largely parallel to the plane of the conductor in each winding layer. The magnitude ratio of peak magnetic surface field intensities for each conductor layer is defined as follows: $R_n = H_n/H_{n-1}$ for each of n layers. Phase shift or phase displacement of magnetic surface field intensities for each conductor layer is defined as: $\Phi_n = \phi_n - \phi_{n-1}$. The turns in FIG. 1 are illustrated by way of vertical lines in each of the winding layers.

Unless otherwise stated, the following additional definitions with implied units are used herein:

$H$: Magnetic Field Intensity, units of $\frac{\text{Ampere} - \text{Turn}}{\text{Meter}}$ $\rho$: Resistivity, units of ohm – meter $\mu_0$: Permeability constant = $4\pi \times 10^{-7} \frac{\text{Henry}}{\text{Meter}}$ $f$: Excitation frequency, units of Hertz $\delta$: Skin Depth = $\sqrt{\frac{\rho}{\pi \mu_0 f}}$ Magnetic components always incur some power dissipation in the winding(s) and core, which decreases efficiency and increases temperature. It is generally known that alternating current (AC) conduction generates eddy currents within the conductors of magnetic components. Such eddy currents are significant at high frequencies and/or for large conductor thicknesses. These eddy currents do not contribute to the macroscopic current of the device, but produce a field which tends to cancel the external magnetic field produced by the AC current. However, the resultant power dissipation, or loss, and energy storage associated with such eddy currents can have a significant impact on the performance of a magnetic component in an electrical circuit. In particular, dissipation from eddy currents can markedly reduce the electrical efficiency of a system and increase the temperature rise of the component. This is due to the well known skin and proximity effects.

Skin effect is the tendency of the current density in a wire to increase at and near the surface of the wire. In other words, skin effect is the tendency of current in a conductor to flow more toward the surface of the conductor as frequency is increased. Current density decays exponentially inside the conductor, reaching a value at the skin depth ($\delta$) of 1/e times the current density at the surface.

Proximity effect occurs when one conductor is placed in an external field generated by one or more other conductors in close proximity. In that case, eddy currents are induced in the conductor which oppose the penetration of the external field. The two eddy current effects occur simultaneously in a conductor carrying an AC current when the conductor is exposed to an external magnetic field. Such eddy currents cause power dissipation in the windings of magnetic components which increase with frequency and/or at large conductor thicknesses.

Heretofore, designers of wound magnetic components have utilized analytical methods to limit or reduce power dissipation based upon mathematical derivations by P. L. Dowell in 1966 (P. L. Dowell, "Effects of Eddy Currents in Transformer Windings," Proceedings of the IEEE, Vol. 113, No. 8, August 1966 [incorporated herein by reference]). P. L. Dowell, as with most prior art, assumes a constant layer thickness or height and does not consider current phase displacement.

High frequency analysis of coil regions has been analyzed using a classical equivalent foil representation of a winding layer. This approach facilitates an understanding of physics and determination of conductor boundary conditions. However, this method neglects stray field effects at edges and other asymmetries. Indeed, stray effects can also arise from unpredictable manufacturing variables such as insulation build up and winding terminations which can cause irregular conductor geometries.

Increased computing power has facilitated iterative approaches to determine winding configurations that yield acceptable dissipation. For example, Finite Element Analysis has improved mathematical consideration of asymmetries and specific device geometries. Finite Element Analysis is frequently used to determine whether a specific component design is acceptable. It is less valuable, however, in generating or suggesting all potential design parameters and determining an optimal or desired solution. Finite Element Analysis software may examine the impact of various configuration parameters such as core type, conductor type and size and the configuration of terms without the need to build and test a physical device.

Prior to the present invention, the minimum loss configurations for the individual winding layers of a magnetic component having more than one layer was not analytically derived for the general case. M. P. Perry, "Multiple Layer Series Connected Winding Design for Minimal losses," IEEE Transactions on Power Apparatus and Systems, Vol. PAS-98, No. 1, January/February 1979, pp. 116-123, discloses an analysis for minimized power dissipation by choosing specific radial thicknesses for each winding layer in a magnetic component. M. P. Perry's analysis is based on general field solutions for current density distributions in winding layers of an infinitely long, cylindrical current sheet. Also, Perry's analysis assumes a fixed number of turns per layer and zero phase displacement. The analysis, therefore, has limited applicability. In addition, the stated twelve percent reduction in power dissipation in the M. P. Perry paper has subsequently been considered too small a benefit when increased manufacturing costs are considered.

Since prior art methods have focused on the equivalent AC resistance of a complete winding portion or region, the optimization or minimization of loss in discrete winding layers within a magnetic component has not been implemented. As a result, configurations of minimum winding dissipation have been elusive and magnetic components have been less efficient and larger or hotter in comparison to results for an optimized configuration.

U.S. Pat. Nos. 6,455,971 and 6,758,430 (Palma et al.) disclose a non-random winding technique to reduce proximity losses in motors and other electric machines. U.S. Pat. No. 6,617,665 (Farcy et al.) discloses an optimized width for inductive windings on an integrated circuit, the width being twice the "skin thickness" corresponding to the maximum frequency of a high frequency current running through the winding. U.S. Pat. No. 6,650,217 (Wolf et al.) discloses a low profile planar magnetic component having a stacked winding configuration and specifying a minimum distance between winding layers and an air gap. U.S. Pat. No. 6,661,326 (Yeh et al.) discloses a wire-winding structure and method to improve transformer power which consists of a method of winding wire from a pin on a bobbin around a plurality of slots. U.S. Pat. No. 6,536,701 (Fulton et al.) discloses the use of an improved former for winding electrical coils. None of these patents discloses a device or method having improved winding parameters as in the present invention.

Generally, the prior art assumes uniform conductor thickness; approximates dissipation in terms of an equivalent AC/DC resistance ratio for the entire winding portion; and suggests that the best way to reduce winding eddy current loss in a magnetic component is to reduce the number of layers. In addition, none of the prior art accounts for phase displacement in determining preferred winding parameters.

There is a need, therefore, for an improved magnetic component having desired or optimal winding parameters including winding layer thickness, number of winding layers and considering variable turns per winding layer. There is also a need for a cost-effective method of designing and/or manufacturing such magnetic components to reduce power dissipation. Since multiple transformer secondaries, for example, can have loads with unequal power factors, or differing non-linear loads (e.g. independent secondary regulators), and since significant magnetization currents can occur in primary windings, the harmonic components of winding currents can have significant relative phase displacement. It is desirable, therefore, to provide a single method of designing or calculating winding parameters which may be applied to general boundary conditions, including consideration for relative phase displacement of winding currents.

BRIEF SUMMARY OF THE INVENTION

With reference to the corresponding steps, parts, portions or surfaces of the disclosed embodiment, merely for purposes of illustration and not by way of limitation, the present invention provides an improved method of determining, calculating and/or designing winding parameters for use in a magnetic component, such as the desired thickness of a winding layer, the desired number of winding layers and the desired number of turns in each winding layer. The novel method may be applied to a single winding layer in one-layer or multi-layer components, or to any number, or all, of the winding layers in such components. The method can also be applied to separate and distinct windings that are placed on a given layer.

The selection of a desired winding parameter, such as winding layer thickness, turns per layer, or number of layers, in accordance with this invention, may result in optimal power dissipation and/or desired power dissipation given manufacturing constraints such as size, cost, minimum/maximum leakage inductance or minimum/maximum capacitance, or other factors. By improving and/or optimizing conductor thicknesses in all or selected layers of a winding, for example, winding dissipation is significantly reduced, yielding higher efficiency and a corresponding opportunity for size or temperature rise reduction. As a result, coils, inductors, transformers, motors and various other magnetic components, and the systems which incorporate them can be made smaller and more efficient in accordance with the present invention, without undue complexity or expensive component materials.

As described above, FIG. 1 is a cross sectional view of a winding region of a magnetic component. AC current within the conductors creates gradients of AC magnetic field within the winding region. These AC magnetic field gradients apply corresponding magnetic field boundary conditions to the conductor elements which induce eddy currents which can significantly increase dissipation. In certain aspects of the invention, desired or optimal conductor geometry is determined as a function of ratio(s) of magnetic field boundary conditions such as peak magnetic surface field intensities. In other aspects, conductor/winding geometry is determined as a function of relative phase displacement between the magnetic fields at the winding layer boundaries. In one aspect, the present invention utilizes a determination of optimum or desired conductor thickness which minimizes winding layer dissipation. In another aspect, this invention specifies the optimum conductor thickness for each layer of the inductive device. Optimum conductor thickness can be implemented, however, on each layer or in selected layers based upon preferences (or limitations) in component material and manufacturing processes.

One aspect of the invention provides the following method of calculating the desired thickness of a winding layer for use in a magnetic component: determining the magnetic field intensity at the inner boundary or surface of a first winding layer; determining the magnetic field intensity at the outer boundary of the first winding layer; calculating a ratio of the magnetic field intensities; and calculating the desired thickness of the first winding layer as a function of this ratio. In certain aspects of the invention, the calculation of a desired thickness minimizes the normalized power loss function, f(H,R,B,Φ), defined in FIG. 3, wherein B is a ratio of the desired thickness to the skin depth (δ) of a winding layer, R is the ratio of the magnitudes of opposing peak magnetic surface field intensities, and Φ is the relative phase displacement between the phases of the magnetic fields at the inner and corresponding outer boundaries or surfaces of a given winding layer. FIG. 2 illustrates such opposing magnetic surface field intensities for an example winding layer (10). The normalized loss function was generated by finding the general solution of the magnetic diffusion equation. A conductor layer is represented as a semi-infinite current sheet having magnetic field boundary conditions that are parallel to the conductor surface. This assumption is valid at least when winding width, l in FIG. 1, is much larger than winding layer thickness. The application of Maxwell's equations generates the diffusion equation which has been classically solved using imaginary representations of magnetic field intensity and current density. True results are given by the real components of the imaginary solutions. The present invention is based in part upon a further derivation of P. L. Dowell's loss expressions to enable effective determination of the optimization function for desired reduced loss configuration(s) for zero phase disparity. Assumed boundary conditions were expanded to encompass phase disparity of magnetic fields and new loss expression(s) and their corresponding optimization functions derived, whose solutions define desired reduced or minimized loss configurations.

In certain aspects of the invention, when phase displacement is zero and winding current is sinusoidal (and R>1), the desired thickness of a winding layer may be calculated in accordance with the expression, cos h(B)=R*cos(B). In another aspect, the calculation of desired thickness comprises: computing power dissipation for a plurality of predetermined thicknesses (e.g. for a selected range, thickness may be varied by a selected increment), which may be limited by manufacturing constraints or otherwise; and selecting a desired thickness having a desired power dissipation. In other aspects of the invention, the method contemplates that various winding parameters be varied in the same manner. In other aspects of the invention, the calculation of a desired thickness of a winding layer comprises: plotting the power loss function, f(H,R,B,Φ), for a plurality of predetermined thicknesses; and selecting a desired thickness having a desired power dissipation. Such predetermined thicknesses may be generated by a computer or determined manually, for example.

Another aspect of the invention provides the following: determining the magnetic field intensity at the inner and outer boundaries of a second winding layer; calculating a ratio of those magnetic field intensities; and calculating the desired thickness of the second winding layer as a function of that ratio. The same determinations and calculations may be made for any number of winding layers and for one, some or all layers in a given component. The desired thickness may minimize the normalized loss function, f(H,R,B,Φ). In another aspect, the desired thickness of a second winding layer is calculated in accordance with the expression: cos h(B) =R*cos(B) as defined above. As in a single layer computation, power dissipation may be computed for a plurality of predetermined thicknesses; and a desired thickness may be selected which has a desired power dissipation. Similarly, another aspect of the invention provides a method by which the power loss function, f(H,R,B,Φ), is plotted for a plurality of predetermined thicknesses of a second (or greater) layer; and a desired thickness is selected which has a desired power dissipation.

In other aspects, the desired thickness calculated or selected pursuant to the invention is the optimal thickness of the winding layer(s). In one aspect, the method of this invention includes: manufacturing a magnetic component having such desired thickness. Another aspect provides a magnetic component having a magnetic winding or windings made according to the method(s) described above. In certain aspects, for sinusoidal winding current corresponding to a situation in which the ratio R=0, the desired thickness of the winding layer(s) may be calculated in accordance with the expression: B=π/2. When R=−1 and phase displacement is zero, the desired thickness(es) may be calculated in accordance with the expression: B=π.

In one aspect of the invention, the desired thickness of the first and/or second winding layer in a winding in a magnetic component is calculated as a function of the relative phase displacement between the phases of the magnetic fields at the inner and corresponding outer boundary of individual winding layers. One aspect of the invention provides the following method of calculating the desired thickness of a winding layer for use in a magnetic component: determining the magnetic field intensity at the inner surface or boundary of a first winding layer; determining the phase of the magnetic field at the same inner boundary; determining the magnetic field intensity at the outer boundary or surface of the first winding layer; determining the phase of the magnetic field at the same outer boundary; calculating a ratio of the magnetic field intensities determined and the relative phase displacement between the phases of the magnetic fields determined; and calculating the desired thickness of the first winding layer as a function of the ratio and the relative phase displacement. In one aspect, for sinusoidal winding current and cos(Φ)>0, the desired thickness of a winding layer may be calculated in accordance with the expression:

$$[R^2+1]/R=[\cos(B)/\cos h(B)+\cos h(B)/\cos(B)]*\cos(\Phi)$$

For the general case with sinusoidal winding current, the desired thickness of a winding layer may be calculated in accordance with the expression:

$$R\cos(\Phi)\sin(B)[\sin h(B)[4\cos^2(B)+1]+\sin h(3B)]-$$
$$[R^2+1]\sin(2B)\sin h(2B)=0$$

Each of the foregoing steps may be undertaken, in accordance with the present invention, for a second winding layer or any number of winding layers in the winding of the magnetic component. In certain aspects, power dissipation is computed in accordance with the power loss function, and the power loss function may be plotted for a plurality of potential winding thicknesses, and a desired thickness selected based on the plot. The conductor which comprises the winding layer in each aspect of the invention may be round wire, square wire, foil sheet, conductive tape or multiple-strand wire. The thickness of round wires can be taken as $$\sqrt{\frac{\pi}{4}}*$$

diameter so that equivalent cross-sectional areas are established for the purpose of analysis. The invention also includes the step of manufacturing a magnetic component (having a magnetic winding) in accordance with the foregoing steps. A magnetic component which is manufactured in accordance with the foregoing steps/methods is also part of the present invention.

For nonsinusoidal winding current (which may include a DC component), the invention provides for the determination, through Fourier decomposition or another method known to those skilled in the art, of one or more of the harmonic components of the winding current. For one or more of the harmonic components, calculations may be made of H, the ratio R and the relative phase displacement for the inner and outer boundaries of each considered winding layer; and a desired thickness determined from such calculations. Dissipation may be determined as a function of H, R, B and $\Phi$ in accordance with the power loss function. In another aspect of the invention, potential winding layer thicknesses are iteratively generated (by computer or otherwise), and a desired thickness may be selected which has a desired harmonic dissipation. In certain aspects, similar to the sinusoidal case, the power loss function is plotted and a desired thickness is selected by computer or by inspection. The foregoing steps may be followed for one, some or all considered winding layers.

The present invention also provides for a determination of the following additional winding parameters: number of winding layers and number of turns per layer. In one aspect, the invention provides the following method for calculating such parameters: determining the harmonic components of the winding current; iteratively generating a plurality of combinations of one or more of the winding parameters (including winding layer thickness); for one or more of the harmonic components, computing power dissipation for a plurality of the generated combinations as a function of the relative phase displacement and/or as a function of the ratio of magnetic surface field intensities between the inner boundary and the outer boundary of each of the iteratively generated winding layers; comparing the resulting power dissipations; and selecting a desired combination of winding parameters having desired power dissipation. The combinations selected may be limited by manufacturing constraints or specification constraints. As in other aspects of the invention, power dissipation may be determined in accordance with the power loss function, $f(H,R,B,\Phi)$, and the comparison of resulting dissipations done by plotting the function. These steps may be undertaken for one, some or all considered winding parameters.

In another aspect, the present invention provides for a determination of winding thickness, number of winding layers and number of turns per layer as follows: varying one or more of the winding parameters; determining boundary conditions at the inner boundary and the outer boundary of one or more winding layers for a plurality of combinations of the varied winding parameters; comparing the boundary conditions at the inner and outer boundaries; and computing power dissipation as a function of the relationships between the compared boundary conditions. Each of the foregoing steps and methods may be implemented through a computer readable medium having computer executable instructions. Such computer readable mediums include without limitation floppy and hard disks, CD-ROM, flash ROM, nonvolatile ROM, DVD, and RAM, for example.

The general object of the invention is to provide a magnetic component (and magnetic winding) having improved, desired or optimal power dissipation. This improvement can be made in consideration of imposed specification or manufacturing constraints. It is a further object of the present invention to provide a method for determining winding parameters (winding layer thickness, number of layers, number of turns per layer) for a wound magnetic component having a desired or optimal winding loss. This desired loss can be achieved in consideration of imposed specification or manufacturing constraints. Another object is to provide a method of winding design which is applicable to any type of component geometry, such as planar transformers, solenoidal transformers, and motor geometries. Still another object is to provide a method which may be applied to general boundary conditions, including consideration for relative phase displacement of winding currents. These and other objects and advantages will become apparent from the foregoing and ongoing written specification, the accompanying drawings and the appended claims.

BRIEF DESCRIPTION OF THE DRAWINGS

FIG. 2 is a cross-sectional view of a winding layer of a magnetic component.

FIG. 3 is an expression for normalized power loss.

FIG. 4 is a chart illustrating the application of the invention to a magnetic component with three windings.

FIG. 5 is a chart illustrating the application of another embodiment of the invention to a magnetic component with two windings.

DESCRIPTION OF THE PREFERRED EMBODIMENTS

Figure 1:
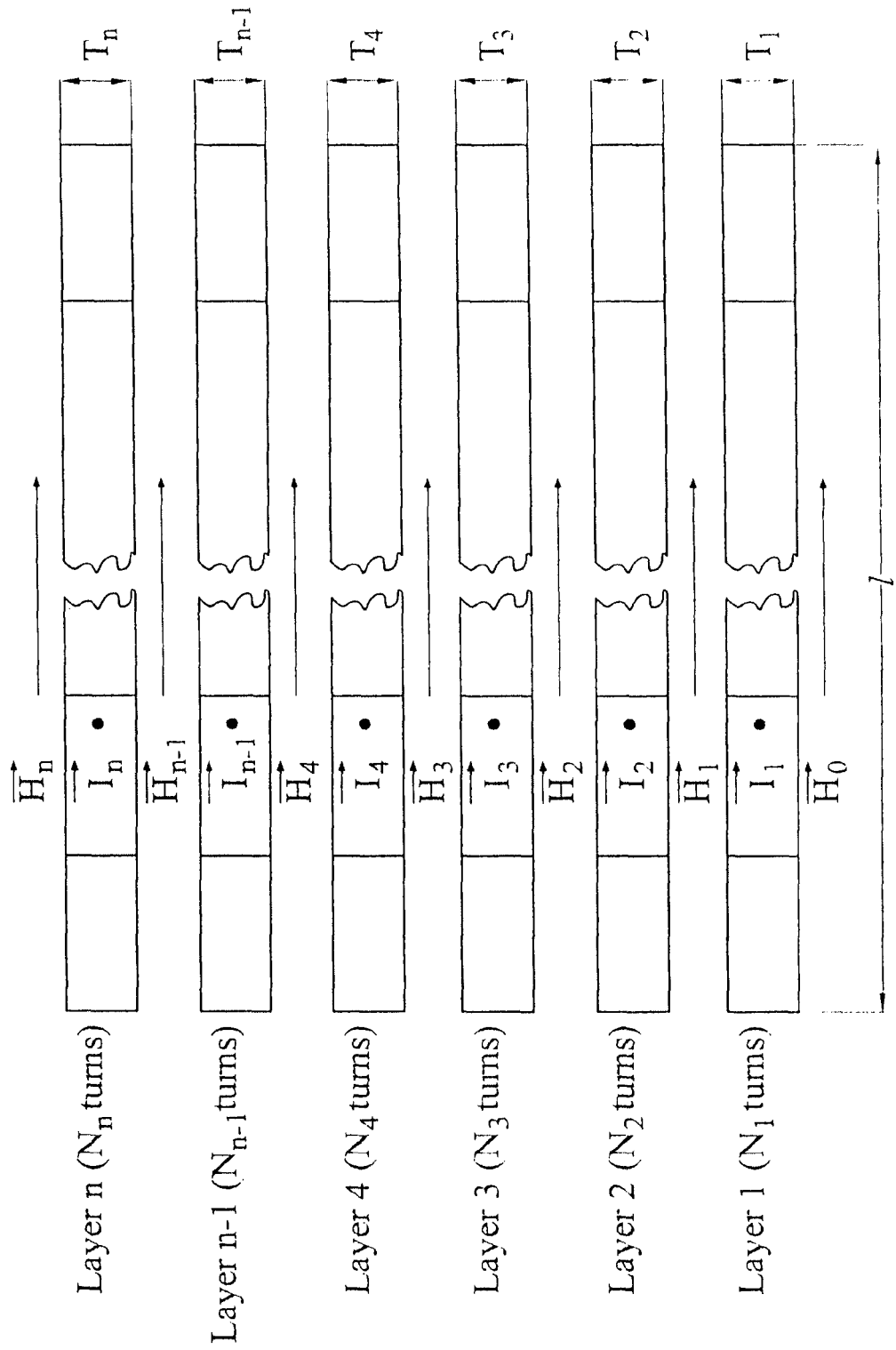
FIG. 1 is a cross-sectional view of a winding region of a magnetic component.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "inner", "outer", "up" and "down", as well as adjectival and adverbial derivatives thereof (e.g. "horizontally", "rightwardly", "upwardly", etc.), or similar terms, simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

In a first preferred embodiment of the present invention, corresponding to AC sinusoidal excitation of a magnetic component having a fixed number of winding layers and a fixed number of turns per winding layer, one or more of the following steps are performed to calculate or determine a desired winding layer thickness in one or more magnetic windings:

a. Identify the current magnitude and phase for each winding in the magnetic component.

b. Using Ampere's Law, calculate the boundary conditions of peak magnetic surface field intensity and phase at each winding layer boundary.

c. For each winding layer, determine the ratio of opposing peak magnetic surface field magnitudes ($R_n$) and the relative phase displacement, $\Phi_n = \phi_n - \phi_{n-1}$.

d. For each winding layer, determine the value of B ($B_{optimum}$) which minimizes the loss function, $f(H,R,B,\Phi)$, set forth in FIG. 3. After applying the loss function, optimum or desired conductor thickness is then equal to $B_{optimum}*\delta$ (skin depth).

e. Use one or more of the following methods to find the minimum or desired values of the loss function:
   i. Plot $f(H,R,B,\Phi)$ as a function of B and find the minimum by inspection.
   ii. Use a computer program to calculate the loss function for a range of potential conductor thicknesses, and select the conductor thickness which yields minimum or desired loss function value.
   iii. For the case of R=0, $B_{optimum}=\pi/2$.
   iv. For the case of R=−1 and $\Phi=0$, $B_{optimum}=\pi$.
   v. For the case of R=1 and $\Phi=0$, $B_{optimum}=0$ (no incremental macroscopic current in the conductor layer).
   vi. For the case of R>1 and $\Phi=0$, determine B using the equation: $\cos h(B)=R*\cos(B)$.
   vii. For the case of R>1 and $\cos(\Phi)>0$, determine B using the equation: $[R^2+1]/R=[\cos(B)/\cos h(B)+\cos h(B)/\cos(B)]*\cos(\Phi)$.
   viii. For the general case, determine B using the function: $R \cos(\Phi)\sin(B)[\sin h(B)[4 \cos^2(B)+1]+\sin h(3B)]-[R^2+1] \sin(2B)\sin h(2B)=0$.

$B_{optimum}$ is given by the first positive zero of this function. In each case, physical and/or manufacturing constraints, among other things, may affect the selection of B, and, therefore, winding layer thickness.

FIG. 4 is a chart representing an example of the application of this embodiment to determine winding layer thickness in a magnetic component having three windings. More specifically, this example relates to a transformer having one primary (Winding 3) and two secondary (Winding 1 and Winding 2) windings, with an assumed load current in each secondary winding of 1 Amp; an assumed primary excitation current at no load of 1 Amp; a winding length in each winding of 0.1 m (corresponding to element 1 in FIG. 1); six winding layers; and six turns per winding layer. Current phase in Windings 1, 2 and 3 is −1.3, 0.5 and 2.23 radians, respectively, with the phase in Winding 3 derived from assumed values in Windings 1 and 2 in consideration of the no load primary excitation current. From the secondary load currents, the magnitude of the current in the primary winding (Winding 3), 1.88 Amps, is calculated using the condition of load Ampere-Turn equivalence to determine the primary load current component. The total primary current is the vector sum of the primary load current component and the primary no load excitation current component. B, the ratio between winding layer thickness and skin depth, is initially assumed to be 2. The magnitude and phase of peak magnetic surface field intensities below and above each layer ($H_{below}$ and $H_{above}$ in FIG. 4) are determined from the following expressions:

$$\vec{H}_n = \vec{H}_{n-1} - \frac{N_n}{l}\vec{I}_n$$

$$\vec{H}_0 = \frac{\sum_{i=1}^{n} N_i \vec{I}_i}{2l}$$

wherein $\vec{H}_n$ equals $H_n \cos(\omega t + \phi_n)$ and $\vec{I}_n$ equals $I_n \cos(\omega t + \Theta_n)$, $\omega$ is the radial frequency and $\phi_n$ and $\Theta_n$ are phase values. FIG. 2 illustrates $\vec{H}_n$ for an example winding layer 10.

Notably, in FIG. 4, the magnitude and phase of the magnetic surface field intensity above Layer Number 1, for example, is equal to the intensity below Layer Number 2, as expected.

The ratio of opposing magnetic surface field intensities ($H_{above}/H_{below}$ in the example) is then computed as well as phase shift. In the example of FIG. 4, normalized dissipation values are then computed for each winding layer. These normalized values are determined from the power loss function, $f(H,R,B,\Phi)$, defined in FIG. 4. The dissipation of each element is referenced to a common value. Therefore, in this example, the normalized dissipation has a value of 100%.

To determine the desired winding layer configuration, the expression in step e.vii. above, for the general case, was plotted. The improved (desired or optimum) value for B was then determined as the value for B which caused the first positive zero of the expression. The bottom portion of the chart in FIG. 4 sets forth the winding layer thicknesses (in terms of B) and related boundary conditions for the improved magnetic component. Notably, each winding layer has a different thickness and the power dissipation is reduced by 16.7 percent. In this example, number of layers and turns per layer were held fixed so boundary conditions are unchanged. Further, no specific skin depth was presented since the utilized expression is not dependent upon skin depth, only B. Although true power is indeed a function of skin depth, actual skin depth is irrelevant because the results in this example are displayed in a normalized comparison.

In another preferred embodiment, corresponding to nonsinusoidal excitation having Fourier harmonic components (which may include DC) and fixed winding layers and a fixed number of turns per winding layer, one or more of the following steps are performed to determine a desired winding layer thickness:

a. Identify the current waveform for each winding in the magnetic component.

b. Using Fourier decomposition, evaluate the harmonic components of each current waveform, noting magnitude and phase for each harmonic component.

c. Using computer iteration, vary the thickness of each winding layer to determine the conductor thickness which minimizes total harmonic dissipation in each layer.
   i. Using the respective harmonic components of each winding current, apply Ampere's Law to evaluate the peak magnetic surface field intensity and phase at each winding layer boundary for each harmonic frequency.
   ii. For each layer, and at each harmonic frequency, determine the ratio of opposing magnetic surface field magnitudes and the relative phase displacement.
   iii. For each layer, calculate the respective harmonic dissipations using the loss function, $f(H,R,B,\Phi)$, applied to each harmonic boundary condition. For a DC component of current, $I_{DC}$, in a winding layer of N turns and winding thickness T, the normalized DC power loss function is:

$$f_{DC} = \frac{1}{T}\left(\frac{N*I_{DC}}{l}\right)^2$$

iv. Calculate the total harmonic dissipation in each layer by summing the dissipations for each harmonic frequency.
   v. For each layer, determine the thickness which minimizes the total harmonic dissipation.

Each of these steps (as with the steps in the other disclosed embodiments) may be performed with the aid of a computer, or through computer software or code, and may be performed manually.

In another preferred embodiment, corresponding to nonsinusoidal excitation having Fourier harmonic components (including DC) and a variable number of winding layers and a variable number of turns per winding layer, one or more of the following steps are performed to determine desired winding parameters comprising winding layer thickness, the number of winding layers and the number of turns per winding layer:

a. Identify the current waveform for each winding in the magnetic component.

b. Using Fourier decomposition, evaluate the harmonic components of each current waveform, noting magnitude and phase for each harmonic component.

c. Using computer iteration, vary the number of layers, the number of turns per layer, and the conductor thickness of each winding layer to determine the configuration which minimizes total winding dissipation.

i. For each considered combination of winding layer(s) and number(s) of turns per layer, apply Ampere's Law to evaluate the magnetic surface field intensity and phase at each conductor layer boundary for each harmonic frequency, using the respective harmonic components of each winding current.

ii. For each considered winding layer(s) and number(s) of turns per layer, and at each harmonic frequency, determine the ratio of opposing surface field magnitudes and the relative phase displacement.

iii. For each considered combination of winding layer(s) and number(s) of turns per layer, calculate the respective harmonic dissipations using the loss function, $f(H,R,B,\Phi)$, applied to each harmonic boundary condition. For a DC component of current, the normalized power loss function is expressed as $f_{DC}$ above.

iv. For each considered combination of layer(s) and number(s) of turns per layer, calculate the total harmonic dissipation by summing the dissipations for each harmonic frequency.

v. For each considered combination of layer(s) and number(s) of turns per layer, determine the thickness which minimizes the total harmonic dissipation.

vi. Evaluate the minimum dissipation for all other considered combinations of winding layers and number of turns per layer using this method.

vii. Determine the particular winding configuration (number of layers, respective turns per layer, and respective conductor layer thicknesses) which yields minimum total loss. As in each embodiment, the winding parameters selected may be limited by cost, manufacturing or physical constraints, or by a specification such as leakage inductance or capacitance.

FIG. 5 is a chart representing an example of the application of this embodiment to determine a desired number of winding layers, turns per layer and winding layer thickness for a transformer having one primary (Winding 2) and one secondary (Winding 1) winding. This problem assumed a variable number of winding layers and turns per winding layer. The example also assumed a load current of 1 Amp and a corresponding current in the primary winding of 1.41 Amps considering an assumed primary no load current of 1 Amp. Winding length l is 0.1 meters. The current phase in Windings 1 and 2 is 0.0 and 2.36 radians, respectively. In this example, the method of this embodiment was applied to only one winding (Winding 2). B was initially assumed to be 1.57 for each of two winding layers. The desired configuration was determined as follows: A specific configuration of number of layers and turns per layer was selected. For the resultant corresponding boundary conditions of R and $\Phi$, the desired winding layer thickness was determined by plotting the expression in step e.vii. The improved (desired or optimum) value for B was determined as the value for B which caused the first positive zero of the expression.

The bottom portion of the chart in FIG. 5, labeled "After Improvement," sets forth the winding layer parameters and related boundary conditions for the improved magnetic component, after applying the method of this embodiment. In this example, power dissipation is improved by 55 percent. One significant aspect of the resulting improved configuration is that the number of turns per layer differs in the three resulting layers, and dissipation is significantly improved. This alone distinguishes from the prior art.

While there has been described what is believed to be the preferred embodiment of the present invention, those skilled in the art will recognize that other and further changes and modifications may be made thereto without departing from the spirit of the invention. For example, the method of the present invention may be applied irrespective of conductor geometry and manufacturing or other physical or cost constraints. Further, all or portions of the inventive method may be applied to all or portions of a magnetic component. Therefore, the invention is not limited to the specific details and representative embodiments shown and described herein. Accordingly, persons skilled in this art will readily appreciate that various additional changes and modifications may be made without departing from the spirit or scope of the invention, as defined and differentiated by the following claims. In addition, the terminology and phraseology used herein is for purposes of description and should not be regarded as limiting.

What is claimed is:

1. A method of calculating the desired thickness of a winding layer for use in a magnetic component, comprising:

determining the magnetic field intensity at the inner boundary of a first winding layer;

determining the magnetic field intensity at the outer boundary of said first winding layer;

calculating a ratio between said magnetic field intensities; and calculating the desired thickness of said first winding layer as a function of said ratio.

2. The method as set forth in claim 1 wherein said desired thickness is calculated in accordance with the expression:

$$\cos h(B) = R^* \cos(B)$$

wherein B is a ratio between said desired thickness and the skin depth of said first winding layer, and R is said ratio between said magnetic field intensities.

3. The method as set forth in claim 1, wherein said calculation of said desired thickness comprises:

computing power dissipation as a function of said ratio between said magnetic field intensities for a plurality of predetermined thicknesses; and selecting a desired thickness having a desired power dissipation.

4. The method as set forth in claim 3 wherein said power dissipation is computed in accordance with the power loss function, $f(H,R,B,\Phi)$.

5. The method as set forth in claim 1 wherein said calculation of said desired thickness comprises:

plotting the power loss function, $f(H,R,B,\Phi)$, for a plurality of predetermined thicknesses; and selecting a desired thickness having a desired power dissipation.

6. The method as set forth in claim 1 wherein said desired thickness is the optimal thickness of said first winding layer.

7. The method as set forth in claim 1, further comprising:
manufacturing a magnetic component having said desired thickness.

8. The method as set forth in claim 1, further comprising:
identifying the magnitude of a winding current in said first winding layer.

9. The method as set forth in claim 8 wherein said winding current is sinusoidal.

10. The method as set forth in claim 1 wherein said magnetic field intensities are peak magnetic surface field intensities.

11. The method as set forth in claim 1 wherein said winding layer comprises round wire, square wire, foil sheet, conductive tape or multiple-strand wire.

12. A magnetic component made according to the method of claim 1.

13. The magnetic component as set forth in claim 12 wherein said magnetic component is selected from the group consisting of: coils, inductors, transformers and motors.

14. The method as set forth in claim 1 wherein said desired thickness is calculated in accordance with the expression:

$$B=\pi/2$$

wherein B is a ratio between said desired thickness and the skin depth of said first winding layer.

15. The method as set forth in claim 1 wherein said desired thickness is calculated in accordance with the expression:

$$B=\pi$$

wherein B is a ratio between said desired thickness and the skin depth of said first winding layer.

16. The method as set forth in claim 1, further comprising:
determining the magnetic field intensity at the inner boundary of a second winding layer;
determining the magnetic field intensity at the outer boundary of said second winding layer;
calculating a ratio between said magnetic field intensities of said second winding layer; and
calculating the desired thickness of said second winding layer as a function of said ratio.

17. The method as set forth in claim 16 wherein said desired thickness of said second winding layer is calculated in accordance with the expression:

$$\cos h(B)=R*\cos(B)$$

wherein B is a ratio between said desired thickness and the skin depth of said second winding layer, and R is said ratio between said magnetic field intensities.

18. The method as set forth in claim 16, wherein said calculation of said desired thickness of said second winding layer comprises:
computing power dissipation as a function of said ratio between said magnetic field intensities for a plurality of predetermined thicknesses; and
selecting a desired thickness having a desired power dissipation.

19. The method as set forth in claim 18 wherein said power dissipation is computed in accordance with the power loss function, $f(H,R,B,\Phi)$.

20. The method as set forth in claim 16 wherein said calculation of said desired thickness of said second winding layer comprises:
plotting the power loss function, $f(H,R,B,\Phi)$, for a plurality of predetermined thicknesses; and
selecting a desired thickness having a desired power dissipation.

21. The method as set forth in claim 16 wherein said desired thickness is the optimal thickness of said second winding layer.

22. The method as set forth in claim 16, further comprising:
manufacturing a magnetic component having said desired thickness.

23. A magnetic component made according to the method of claim 16.

24. The method as set forth in claim 16 wherein said desired thickness of said second winding layer is calculated in accordance with the expression:

$$B=\pi/2$$

wherein B is a ratio between said desired thickness and the skin depth of said second winding layer.

25. The method as set forth in claim 16 wherein said desired thickness of said second winding layer is calculated in accordance with the expression:

$$B=\pi$$

wherein B is a ratio between said desired thickness and the skin depth of said second winding layer.

26. A method of calculating the desired thickness of a winding layer for use in a magnetic component, comprising:
determining the magnetic field phase at the inner boundary of a first winding layer;
determining the magnetic field phase at the outer boundary of said first winding layer;
calculating the relative phase displacement between said phases;
calculating the desired thickness of said first winding layer as a function of said relative phase displacement.

27. The method as set forth in claim 26 wherein said calculation of said desired thickness comprises:
computing power dissipation as a function of said relative phase displacement for a plurality of predetermined thicknesses; and
selecting a desired thickness of said first winding layer having a desired power dissipation.

28. The method as set forth in claim 26 wherein said calculation of said desired thickness comprises:
plotting power dissipation as a function of said relative phase displacement for a plurality of predetermined thicknesses; and
selecting a desired thickness having a desired power dissipation.

29. The method as set forth in claim 26, further comprising:
manufacturing a magnetic component having said desired thickness.

30. A magnetic component made according to the method of claim 26.

31. The magnetic component as set forth in claim 30 wherein said magnetic component is selected from the group consisting of: coils, inductors, transformers and motors.

32. The method as set forth in claim 26, further comprising:
determining the magnetic field phase at the inner boundary of a second winding layer;
determining the magnetic field phase at the outer boundary of said second winding layer;
calculating the relative phase displacement between said phases;
calculating the desired thickness of said second winding layer as a function of said relative phase displacement.

33. The method as set forth in claim 32 wherein said calculation of said desired thickness comprises:
 computing power dissipation as a function of said relative phase displacement for a plurality of predetermined thicknesses; and
 selecting a desired thickness of said second winding layer having a desired power dissipation.

34. The method as set forth in claim 32 wherein said calculation of said desired thickness comprises:
 plotting power dissipation as a function of said relative phase displacement for a plurality of predetermined thicknesses; and
 selecting a desired thickness of said second winding layer having a desired power dissipation.

35. The method as set forth in claim 32, further comprising: manufacturing a magnetic component having said desired thickness.

36. A magnetic component made according to the method of claim 32.

37. A method of calculating the desired thickness of a winding layer for use in a magnetic component, comprising:
 determining the magnetic field intensity at the inner boundary of a first winding layer;
 determining the magnetic field phase at the inner boundary of said first winding layer;
 determining the magnetic field intensity at the outer boundary of said first winding layer;
 determining the magnetic field phase at the outer boundary of said first winding layer;
 calculating a ratio between said magnetic field intensities;
 calculating the relative phase displacement between said phases; and
 calculating the desired thickness of said first winding layer as a function of said ratio and said relative phase displacement.

38. The method as set forth in claim 37 wherein said desired thickness is calculated in accordance with the expression:

$$[R^2+1]/R=[\cos(B)/\cos h(B)+\cos h(B)/\cos(B)]*\cos(\Phi)$$

wherein B is a ratio between said desired thickness and the skin depth of said first winding layer, R is said ratio between said magnetic field intensities, and $\Phi$ is said relative phase displacement.

39. The method as set forth in claim 37, wherein said calculation of said desired thickness comprises:
 computing power dissipation as a function of said ratio between said magnetic field intensities for a plurality of predetermined thicknesses; and
 selecting a desired thickness having a desired power dissipation.

40. The method as set forth in claim 39 wherein said power dissipation is computed in accordance with the power loss function, $f(H,R,B,\Phi)$.

41. The method as set forth in claim 37, wherein said calculation of said desired thickness comprises:
 computing power dissipation as a function of said relative phase displacement for a plurality of predetermined thicknesses; and
 selecting a desired thickness having a desired power dissipation.

42. The method as set forth in claim 41 wherein said power dissipation is computed in accordance with the power loss function, $f(H,R,B,\Phi)$.

43. The method as set forth in claim 37 wherein said calculation of said desired thickness comprises:
 computing power dissipation as a function of said ratio between said magnetic field intensities and said relative phase displacement for a plurality of predetermined thicknesses; and
 selecting a desired thickness having a desired power dissipation.

44. The method as set forth in claim 43 wherein said power dissipation is computed in accordance with the power loss function, $f(H,R,B,\Phi)$.

45. The method as set forth in claim 37 wherein said calculation of said desired thickness comprises:
 plotting the power loss function, $f(H,R,B,\Phi)$, for a plurality of predetermined thicknesses; and
 selecting a desired thickness having a desired power dissipation.

46. The method as set forth in claim 37 wherein said desired thickness is the optimal thickness of said first winding layer.

47. The method as set forth in claim 37, further comprising: manufacturing a magnetic component having said desired thickness.

48. The method as set forth in claim 37, further comprising: identifying the magnitude and phase of a winding current in said first winding layer.

49. The method as set forth in claim 48 wherein said winding current is sinusoidal.

50. The method as set forth in claim 37 wherein said magnetic field intensities are peak magnetic surface field intensities.

51. The method as set forth in claim 37 wherein said winding layer comprises round wire, square wire, foil sheet, conductive tape or multiple-strand wire.

52. A magnetic component made according to the method of claim 37.

53. The magnetic component as set forth in claim 52 wherein said magnetic component is selected from the group consisting of: coils, inductors, transformers and motors.

54. The method as set forth in claim 37, further comprising:
 determining the magnetic field intensity at the inner boundary of a second winding layer;
 determining the magnetic field phase at the inner boundary of said second winding layer;
 determining the magnetic field intensity at the outer boundary of said second winding layer;
 determining the magnetic field phase at the outer boundary of said second winding layer;
 calculating a ratio between said magnetic field intensities of said second winding layer;
 calculating the relative phase displacement between said phases; and
 calculating the desired thickness of said second winding layer as a function of said ratio and said phase displacement.

55. The method as set forth in claim 54 wherein said desired thickness of said second winding layer is calculated in accordance with the expression:

$$[R^2+1]/R=[\cos(B)/\cos h(B)+\cos h(B)/\cos(B)]*\cos(\Phi)$$

wherein B is a ratio between said desired thickness and the skin depth of said second winding layer, R is said ratio between said magnetic field intensities, and $\Phi$ is said relative phase displacement.

56. The method as set forth in claim 54, wherein said calculation of said desired thickness comprises:
 computing power dissipation as a function of said ratio between said magnetic field intensities for a plurality of predetermined thicknesses; and selecting a desired thickness having a desired power dissipation.

57. The method as set forth in claim 56 wherein said power dissipation is computed in accordance with the power loss function, $f(H,R,B,\Phi)$.

58. The method as set forth in claim 54, wherein said calculation of said desired thickness comprises:
computing power dissipation as a function of said relative phase displacement for a plurality of predetermined thicknesses; and
selecting a desired thickness having a desired power dissipation.

59. The method as set forth in claim 58 wherein said power dissipation is computed in accordance with the power loss function, $f(H,R,B,\Phi)$.

60. The method as set forth in claim 54, wherein said calculation of said desired thickness comprises:
computing power dissipation as a function of said ratio between said magnetic field intensities and said relative phase displacement for a plurality of predetermined thicknesses; and
selecting a desired thickness having a desired power dissipation.

61. The method as set forth in claim 60 wherein said power dissipation is computed in accordance with the power loss function, $f(H,R,B,\Phi)$.

62. The method as set forth in claim 54 wherein said calculation of said desired thickness comprises:
plotting the power loss function, $f(H,R,B,\Phi)$, for a plurality of predetermined thicknesses; and
selecting a desired thickness having a desired power dissipation.

63. The method as set forth in claim 54 wherein said desired thickness is the optimal thickness of said first winding layer.

64. The method as set forth in claim 54, further comprising:
manufacturing a magnetic component having said desired thickness.

65. A magnetic component made according to the method of claim 54.

66. A method of calculating the desired thickness of a winding layer for use in a magnetic component, comprising:
determining the magnetic field intensity at the inner boundary of a first winding layer;
determining the magnetic field phase at the inner boundary of said first winding layer;
determining the magnetic field intensity at the outer boundary of said first winding layer;
determining the magnetic field phase at the outer boundary of said first winding layer;
calculating a ratio between said magnetic field intensities;
calculating the relative phase displacement between said phases; and
calculating the desired thickness of said first winding layer in accordance with the expression:

$R\cos(\Phi)\sin(B)[\sin h(B)[4\cos^2(B)+1]+\sin h(3B)]-[R^2+1]\sin(2B)\sin h(2B)=0$ wherein B is a ratio between said desired thickness and the skin depth of said first winding layer, R is said ratio between said magnetic field intensities, and $\Phi$ is said relative phase displacement.

67. The method as set forth in claim 66, wherein said calculation of said desired thickness comprises:
computing power dissipation as a function of said ratio between said magnetic field intensities and said relative phase displacement for a plurality of predetermined thicknesses; and
selecting a desired thickness having a desired power dissipation.

68. The method as set forth in claim 67 wherein said power dissipation is computed in accordance with the power loss function, $f(H,R,B,\Phi)$.

69. The method as set forth in claim 66, wherein said calculation of said desired thickness comprises:
plotting the power loss function, $f(H,R,B,\Phi)$, for a plurality of predetermined thicknesses; and
selecting a desired thickness having a desired power dissipation.

70. The method as set forth in claim 66 wherein said desired thickness is the optimal thickness of said first winding layer.

71. The method as set forth in claim 66, further comprising:
manufacturing a magnetic component having said desired thickness.

72. The method as set forth in claim 66 wherein said magnetic field intensities are peak magnetic surface field intensities.

73. A magnetic component made according to the method of claim 66.

74. The magnetic component as set forth in claim 73 wherein said magnetic component is selected from the group consisting of: coils, inductors, transformers and motors.

75. The method as set forth in claim 66, further comprising:
determining the magnetic field intensity at the inner boundary of a second winding layer;
determining the magnetic field phase at the inner boundary of said second winding layer;
determining the magnetic field intensity at the outer boundary of said second winding layer;
determining the magnetic field phase at the outer boundary of said second winding layer;
calculating a ratio between said magnetic field intensities of said second winding layer;
calculating the relative phase displacement between said phases; and
calculating the desired thickness of said second winding layer as a function of said ratio and said relative phase displacement.

76. The method as set forth in claim 75 wherein said desired thickness of said second winding layer is calculated in accordance with the expression:

$R\cos(\Phi)\sin(B)[\sin h(B)[4\cos^2(B)+1]+\sin h(3B)]-[R^2+1]\sin(2B)\sin h(2B)=0.$ 77. The method as set forth in claim 75, wherein said calculation of said desired thickness of said second winding layer comprises:
computing power dissipation as a function of said ratio between said magnetic field intensities and said relative phase displacement for a plurality of predetermined thicknesses; and
selecting a desired thickness of said second winding layer having a desired power dissipation.

78. The method as set forth in claim 77 wherein said power dissipation is computed in accordance with the power loss function, $f(H,R,B,\Phi)$.

79. The method as set forth in claim 75, wherein said calculation of said desired thickness of said second winding layer comprises:

plotting the power loss function f(H,R,B,Φ), for a plurality of predetermined thicknesses; and selecting a desired thickness of said second winding layer having a desired power dissipation.

80. The method as set forth in claim 75 wherein said desired thickness is the optimal thickness of said first winding layer.

81. The method as set forth in claim 75, further comprising: manufacturing a magnetic component having said desired thickness.

82. The method as set forth in claim 75 wherein said magnetic field intensities are peak magnetic surface field intensities.

83. A magnetic component made according to the method of claim 75.

84. A method of calculating the desired thickness of a winding layer for use in a magnetic component having a winding current, comprising:
  determining the harmonic components of a winding current;
  for one or more of said harmonic components:
   a. determining the magnetic field intensity at the inner boundary of a first winding layer;
   b. determining the magnetic field phase at the inner boundary of said first winding layer;
   c. determining the magnetic field intensity at the outer boundary of said first winding layer;
   d. determining the magnetic field phase at the outer boundary of said first winding layer;
   e. calculating a ratio between said magnetic field intensities; and
   f. calculating the relative phase displacement between said phases; and
  determining the desired thickness of said first winding layer as a function of said ratios and said relative phase displacements.

85. The method as set forth in claim 84, further comprising: determining the harmonic dissipation in said first winding layer.

86. The method as set forth in claim 85 wherein said harmonic dissipation is determined as a function of said ratios between corresponding magnetic field intensities.

87. The method as set forth in claim 85 wherein said harmonic dissipation is determined as a function of said relative phase displacements between corresponding phases.

88. The method as set forth in claim 85 wherein said harmonic dissipation is determined as a function of conductor thickness.

89. The method as set forth in claim 85 wherein said harmonic dissipation is determined as a function of R, Φ and conductor thickness, wherein R is said ratio between corresponding magnetic field intensities, and Φ is said relative phase displacement between corresponding phases.

90. The method as set forth in claim 89 wherein said harmonic dissipation is determined in accordance with the power loss function, f(H,R,B,Φ).

91. The method as set forth in claim 84 wherein said desired thickness is determined according to a method comprising:
  iteratively generating a plurality of winding layer thicknesses for said first winding layer; and
  selecting a desired thickness having a desired harmonic dissipation.

92. The method as set forth in claim 91, further comprising: plotting the power loss function, f(H,R,B,Φ), for one or more of said iteratively generated winding layer thicknesses.

93. The method as set forth in claim 91 wherein said harmonic dissipation is determined in accordance with the power loss function, f(H,R,B,Φ).

94. The method as set forth in claim 84 wherein said harmonic components are determined using Fourier decomposition.

95. The method as set forth in claim 84 wherein said harmonic components comprise a DC component.

96. The method as set forth in claim 84, further comprising: manufacturing a magnetic component having said desired thickness.

97. The method as set forth in claim 84, further comprising: identifying the wave form of said winding current.

98. The method as set forth in claim 97 wherein said winding current is nonsinusoidal.

99. A magnetic component made according to the method of claim 84.

100. The magnetic component as set forth in claim 84 wherein said magnetic component is selected from the group consisting of: coils, inductors, transformers and motors.

101. The method as set forth in claim 84, further comprising:
  for one or more of said harmonic components:
   a. determining the magnetic field intensity at the inner boundary of a second winding layer;
   b. determining the magnetic field phase at the inner boundary of said second winding layer;
   c. determining the magnetic field intensity at the outer boundary of said second winding layer;
   d. determining the magnetic field phase at the outer boundary of said second winding layer;
   e. calculating a ratio between said magnetic field intensities of said second winding layer; and
   f. calculating the relative phase displacement between said phases; and
  determining the desired thickness of said second winding layer as a function of said ratios and said relative phase displacements.

102. The method as set forth in claim 101, further comprising:
  determining the harmonic dissipation in said second winding layer.

103. The method as set forth in claim 102, further comprising:
  selecting a desired thickness of said first winding layer and a desired thickness of said second winding layer which results in a desired harmonic dissipation.

104. The method as set forth in claim 102 wherein said harmonic dissipation is determined as a function of R, Φ and conductor thickness, wherein R is said ratio between corresponding magnetic field intensities, and Φ is said relative phase displacement between corresponding phases.

105. The method as set forth in claim 104 wherein said harmonic dissipation is determined in accordance with the power loss function, f(H,R,B,Φ).

106. The method as set forth in claim 101 wherein said desired thickness of said second winding layer is determined according to a method comprising:
  iteratively generating a plurality of predetermined winding layer thicknesses for said second winding layer; and
  selecting a desired thickness of said second winding layer having a desired harmonic dissipation.

107. The method as set forth in claim 106, further comprising:
  plotting the power loss function, f(H,R,B,Φ), for one or more of said iteratively generated winding layer thicknesses.

108. The method as set forth in claim 106 wherein said harmonic dissipation is determined in accordance with the power loss function, f(H,R,B,Φ).

109. The method as set forth in claim 101, further comprising:
   manufacturing a magnetic component having said desired thickness.

110. A magnetic component made according to the method of claim 101.

111. A magnetic component, comprising:
   a winding portion comprising a first winding layer having a thickness defined by the following expression:

$\cos h(B) = R*\cos(B)$ wherein B is a ratio between said thickness and the skin depth of said first winding layer, and R is the ratio between the magnetic field intensity at the outer boundary of said first winding layer and the magnetic field intensity at the inner boundary of said first winding layer.

112. The magnetic component as set forth in claim 111, further comprising:
   a second winding layer having a thickness determined in accordance with said expression.

113. A magnetic component, comprising:
   a winding portion comprising a first winding layer having a thickness defined by the following expression:

$[R^2+1]/R = [\cos(B)/\cos h(B) + \cos h(B)/\cos(B)]*\cos(\Phi)$ wherein B is a ratio between said thickness and the skin depth of said first winding layer, R is said ratio between the magnetic field intensity at the outer boundary of said first winding layer and the magnetic field intensity at the inner boundary of said first winding layer, and Φ is said relative phase displacement between said outer boundary and said inner boundary.

114. The magnetic component as set forth in claim 113, further comprising:
   a second winding layer having a thickness determined in accordance with said expression.

115. A magnetic component, comprising:
   a winding portion comprising a first winding layer having a thickness defined by the following expression:

$R\cos(\Phi)\sin(B)[\sin h(B)[4\cos^2(B)+1]+\sin h(3B)] - [R^2+1]\sin(2B)\sin h(2B) = 0$ wherein B is a ratio between said thickness and the skin depth of said first winding layer, R is said ratio between the magnetic field intensity at the outer boundary of said first winding layer and the magnetic field intensity at the inner boundary of said first winding layer, and Φ is said relative phase displacement between said outer boundary and said inner boundary.

116. The magnetic component as set forth in claim 115, further comprising:
   a second winding layer having a thickness determined in accordance with said expression.

* * * * *